US012753102B2

(12) United States Patent
Xu et al.

(10) Patent No.: US 12,753,102 B2
(45) Date of Patent: Oct. 6, 2026

(54) TWO-STAGE CO-LIQUEFACTION MIXING-REACTION-FILTRATION-HEAT RECOVERY INTEGRATED APPARATUS

(71) Applicant: XI'AN JIAOTONG UNIVERSITY, Xi'an (CN)

(72) Inventors: Donghai Xu, Xi'an (CN); Botian Hao, Xi'an (CN); Yunfei Diao, Xi'an (CN); Ya Wei, Xi'an (CN); Mingxin Xu, Xi'an (CN); Yang Guo, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 330 days.

(21) Appl. No.: 18/746,484

(22) Filed: Jun. 18, 2024

(65) Prior Publication Data

US 2024/0383791 A1 Nov. 21, 2024

Related U.S. Application Data

(63) Continuation of application No. PCT/CN2023/105230, filed on Jun. 30, 2023.

(30) Foreign Application Priority Data

May 15, 2023 (CN) ........................ 202310545400.X

(51) Int. Cl.
*C02F 11/18* (2006.01)

(52) U.S. Cl.
CPC .......... *C02F 11/18* (2013.01); *C02F 2303/10* (2013.01)

(58) Field of Classification Search
CPC ....................................................... C02F 11/18
See application file for complete search history.

(56) References Cited

U.S. PATENT DOCUMENTS

2021/0214633 A1* 7/2021 Thorson ................. C10G 1/065

FOREIGN PATENT DOCUMENTS

| | | | | |
|---|---|---|---|---|
| CN | 110368885 A | * 10/2019 | ............. | C11B 3/008 |
| CN | 110527558 A | * 12/2019 | ................ | C10J 3/46 |
| CN | 113214857 A | * 8/2021 | ............. | C01B 32/00 |

OTHER PUBLICATIONS

CN110368885A, Machine Translation (Year: 2019).*
CN-110527558, Machine Translation (Year: 2019).*
CN-113214857A, Machine Translation (Year: 2021).*

* cited by examiner

*Primary Examiner* — Ekandra S. Miller-Cruz
*Assistant Examiner* — Mahmoud Motaz Abdel Latif
(74) *Attorney, Agent, or Firm* — Nitin Kaushik

(57) ABSTRACT

The present disclosure provides a two-stage co-liquefaction mixing-reaction-filtration-heat recovery integrated apparatus, realizing the implementation of a two-stage HTL process; secondly, a nozzle, a receiving chamber, a mixing chamber and a diffusion chamber are disposed at different material feed ports and medium feed ports, and high-speed fluids are fully collided and mixed in these structures; heat of HTL in a first stage is from heat of an HTL product in a second stage, which achieves the recycling of the heat of the HTL product in the second stage, improving economic efficiency; in a first-stage HTL process, through the setting of high-temperature and high-pressure needle valves, so that different first-stage HTL reaction times are selected for different material characteristics; and each first-stage HTL reaction tube is provided with an inclination of 1-3°, and a second-stage HTL generation chamber is provided with a residue scraping device and a salt scraping device.

8 Claims, 1 Drawing Sheet

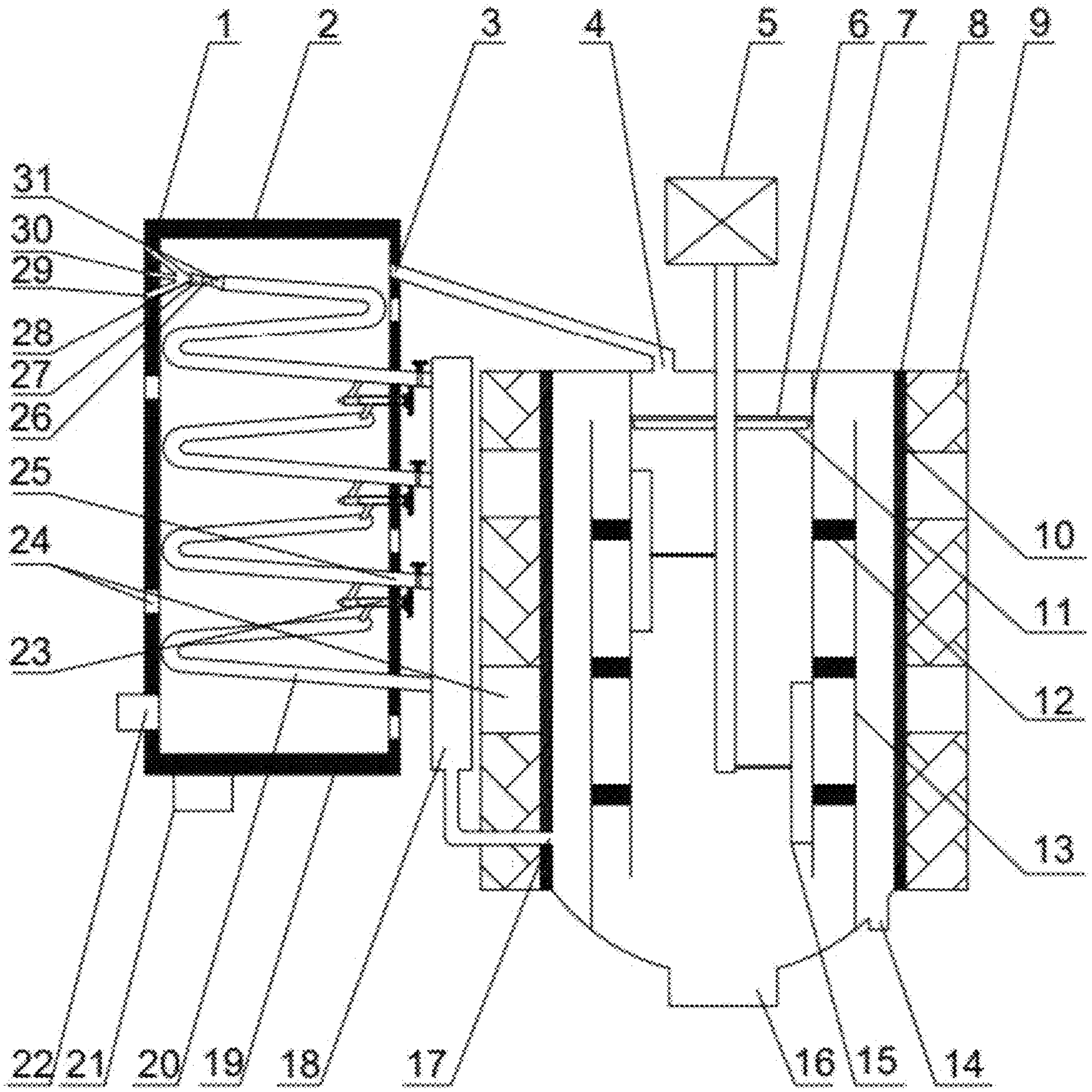
1
2
3
4
5
6
7
8
9
31
30
29
28
27
26
25
24
23
10
11
12
13
22
21
20
19
18
17
16
15
14

TWO-STAGE CO-LIQUEFACTION MIXING-REACTION-FILTRATION-HEAT RECOVERY INTEGRATED APPARATUS

CROSS-REFERENCE TO RELATED APPLICATIONS

The application claims priority to Chinese patent application No. 202310545400X, filed on May 15, 2023, the entire contents of which are incorporated herein by reference.

TECHNICAL FIELD

The present disclosure relates to the technical field of hydrothermal liquefaction (HTL) devices, in particular to a two-stage co-liquefaction mixing-reaction-filtration-heat recovery integrated apparatus.

BACKGROUND

Co-hydrothermal liquefaction is a process in which two or more feedstocks are mixed for HTL. Mixing different materials together to participate in a reaction can produce not only a simple additive effect, but also produce a compound effect due to the synergistic or antagonistic effects of these materials. Experimental studies have found that co-hydrothermal liquefaction between different material compositions has a significant synergistic effect, and high-quality and high-yield biocrude can often be obtained. Therefore, the development of the advanced and efficient co-hydrothermal liquefaction technology to efficiently perform biomass conversion and to perform biomass resource utilization has become a new direction of development in the field of hydrothermal technology.

Two-stage HTL is to perform hydrothermal treatment at a low temperature in a first stage, and then perform HTL at more severe conditions, and the presence of low-temperature hydrothermal treatment significantly affects the final elemental composition, higher heating value (HHV), energy recovery rate, molecular composition, as well as the concentration of total organic carbon (TOC) in an aqueous phase and solid yield. And the potential energy consumption savings and reaction temperature reduction results in reduced equipment costs, thus indicating that two-stage HTL is an ideal liquefaction process.

Currently, most of HTL reaction systems designed relate to a single-pass single-substance HTL reaction, the conventional HTL reactor is a simple tubular reactor, and there are some problems as follows during use: there is no reactor suitable for two-stage HTL; a material mixer, a reactor, a solid-phase product filter, and heat recovery for HTL are separated, causing problems of complex systems and high equipment costs; high concentrations of salt and ash are present in biomass, particularly municipal sludge, with a risk of severe blockage of pipelines caused by salt deposition due to high temperature; and a plurality of simple material inlets are disposed, the mixing efficiency of materials and mediums is low, and different component molecules cannot be fully contacted.

Therefore, in order to solve the above problems and achieve two-stage co-hydrothermal liquefaction of a plurality of biomasses, a highly integrated apparatus that can achieve efficient mixing, perform a two-stage HTL reaction, and separate a solid phase in an HTL product is urgently needed.

SUMMARY

In order to overcome the above defects existing in the prior art, an object of the present disclosure is to provide a two-stage co-liquefaction mixing-reaction-filtration-heat recovery integrated apparatus to solve the technical problems that the mixing efficiency of a plurality of materials and mediums is low; and a material mixer, a reactor, a solid-phase product filter, and heat recovery for HTL are separated and complex, so two-stage HTL cannot be achieved and there is a risk of severe blockage of pipelines caused by deposition of salt in biomass due to high temperature in the prior art.

The present disclosure is achieved by the following technical solutions:

a two-stage co-liquefaction mixing-reaction-filtration-heat recovery integrated apparatus includes a first-stage hydrothermal liquefaction (HTL) generation chamber, a second-stage HTL generation chamber and a mid-temperature hydrothermal transition product collection tank, wherein one side at a top of the first-stage HTL generation chamber is provided with a plurality of material feed ports and medium feed ports, the other side at the top of the first-stage HTL generation chamber is provided with a high-temperature hydrothermal product feed inlet, a hydrothermal product discharge port is disposed at a bottom of the first-stage HTL generation chamber, a plurality of first-stage HTL reaction tubes are obliquely disposed inside the first-stage HTL generation chamber, the plurality of the first-stage HTL reaction tubes are connected in sequence, one end of each of the first-stage HTL reaction tubes extends out through an inner wall of the first-stage HTL generating chamber and is connected to an input end of the mid-temperature hydrothermal transition product collection tank, and one end of the first-stage HTL reaction tube at a top is connected to the plurality of the material feed ports and the medium feed port; a mid-temperature hydrothermal transition product feed inlet is disposed on a side wall at a bottom of the second-stage HTL generation chamber, and an output end of the mid-temperature hydrothermal transition product collection tank is connected to the mid-temperature hydrothermal transition product feed inlet; the second-stage HTL generation chamber is coaxially provided with a second baffle cylinder and a first baffle cylinder along an inner wall to a central position, wherein a heating zone is formed between an outer wall of the second baffle cylinder and the inner wall of the second-stage HTL generation chamber, a catalytic zone formed between the second baffle cylinder and the first baffle cylinder is provided with a plurality of catalyst grids, a heat preservation zone is formed in the first baffle cylinder, the top of the second-stage HTL generation chamber corresponding to the heat preservation zone is provided with a high-temperature hydrothermal product discharge port, the high-temperature hydrothermal product discharge port communicates with the high-temperature hydrothermal product feed inlet, the first baffle cylinder is provided with a residue removal mechanism, the bottom of the second-stage HTL generation chamber is provided with a second residue discharge port, and an outer side at the bottom of the second-stage HTL generation chamber is further provided with a first residue discharge port.

Preferably, a nozzle is disposed between the plurality of the material feed ports and the medium feed port and one end of the first-stage HTL reaction tube at the top, wherein one end of the nozzle is provided with a plurality of pipes which are correspondingly connected to the plurality of the material feed ports and the medium feed port in sequence, and the other end of the nozzle is a single pipe which is connected with one end of the first-stage HTL reaction tube;

a receiving pipe, a mixing pipe, and a diffusion pipe are disposed in sequence between the single pipe and one end of the first-stage HTL reaction tube, wherein the receiving pipe, the mixing pipe, and the diffusion pipe are in a reduced diameter structure.

Preferably, each first-stage HTL reaction tube is provided with an inclination angle of 1-3°.

Preferably, high-temperature and high-pressure needle valves are disposed at one end of each first-stage HTL reaction tube near the mid-temperature hydrothermal transition product collection tank and between the first-stage HTL reaction tubes.

Preferably, an electric heating coil is disposed between a second insulation layer and an outer wall of the second-stage HTL generation chamber.

Preferably, the top of the first baffle cylinder is provided with a filter screen, and the residue removal mechanism extends into the first baffle cylinder through the filter screen.

Further, the residue removal mechanism includes a motor, a rotating shaft, a residue scraping device and a salt scraping device, wherein one end of the rotating shaft is equipped with the motor, the other end of the rotating shaft extends into the first baffle cylinder through the filter screen, and the residue scraping device and the salt scraping device are respectively mounted on the rotating shaft in the first baffle cylinder.

Preferably, the first-stage HTL generation chamber is provided with a microwave controller, and the first-stage HTL generation chamber and the second-stage HTL generation chamber are both provided with a plurality of microwave generators.

Compared with the prior art, the present disclosure has the following beneficial technical effects:

The present disclosure provides the two-stage co-liquefaction mixing-reaction-filtration-heat recovery integrated apparatus, realizing the implementation of a two-stage HTL process; secondly, the nozzle, a receiving chamber, a mixing chamber and a diffusion chamber are disposed at different material feed ports and the medium feed port, and high-speed fluids are fully collided and mixed in these structures; thirdly, heat of HTL in the first stage is from the heat of HTL products in the second stage, which simultaneously achieves the occurrence of an HTL reaction in the first stage and the recycling of the heat of the HTL products in the second stage, improving economic efficiency; fourth, in a first-stage HTL process, through the setting of high-temperature and high-pressure needle valves, precise control of different reaction times is achieved, so that different first-stage HTL reaction times are selected for different material characteristics; and finally, each first-stage HTL reaction tube is provided with an inclination of 1-3°, and a second-stage HTL generation chamber is provided with a residue scraping device and a salt scraping device, so stable operation of a reactor is ensured. The apparatus is a highly integrated apparatus, which realizes the coupling of mixing, reaction, filtration, and heat recovery processes, greatly reducing the complexity and construction cost of the system. A new liquefaction process of co-hydrothermal liquefaction and two-stage HTL is used to obtain high yield and high-quality biocrude, improving the economic efficiency of the system, and promoting the industrial development of HTL technology.

Further, the nozzle is disposed between the plurality of the material feed ports and the medium feed ports and one end of the first-stage HTL reaction tube at the top, wherein one end of the nozzle is provided with the plurality of pipes which are correspondingly connected to the plurality of the material feed ports and the medium feed ports in sequence, the other end of the nozzle is the single pipe which is connected to one end of the first-stage HTL reaction tube, and the receiving pipe, the mixing pipe, and the diffusion pipe are arranged in sequence between the single pipe and one end of the first-stage HTL reaction tube, wherein the receiving pipe, the mixing pipe, and the diffusion pipe are in a reduced diameter structure, which improves the mixing efficiency between a plurality of materials and mediums.

Further, the high-temperature and high-pressure needle valves are disposed at one end of each first-stage HTL reaction tube near the mid-temperature hydrothermal transition product collection tank and between the first-stage HTL reaction tubes, the outflow of a first-stage HTL product is controlled by opening and closing of the high-temperature and high-pressure needle valves, and precise control of the first-stage HTL reaction time is achieved.

Further, the catalytic zone between the second baffle cylinder and the first baffle cylinder is provided with the plurality of catalyst grids, which effectively promote the occurrence of the HTL reaction.

Further, the top of the first baffle cylinder is provided with the filter screen, and the residue removal mechanism extends into the first baffle cylinder through the filter screen to achieve the separation of a solid-phase product from the HTL.

Further, the residue removal mechanism includes the motor, the rotating shaft, the residue scraping device and the salt scraping device; one end of the rotating shaft is equipped with the motor, and the other end of the rotating shaft extends into the first baffle cylinder through the filter screen, and the residue scraping device and the salt scraping device are respectively mounted on the rotating shaft in the first baffle cylinder to achieve continuous and efficient operation of the filter screen and to reduce salt deposition on the inner wall of the reactor.

Further, the first-stage HTL generation chamber is provided with the microwave controller, and the first-stage HTL generation chamber and the second-stage HTL generation chamber are both provided with the plurality of microwave generators to assist the HTL reaction to improve the yield and quality of biocrude.

BRIEF DESCRIPTION OF DRAWINGS

The FIGURE is a structure diagram of a reactor according to the present disclosure.

In the FIGURE: 1—first material feed port; 2—first insulation layer; 3—high-temperature hydrothermal product feed inlet; 4—high-temperature hydrothermal product discharge port; 5—motor; 6—filter screen; 7—first baffle cylinder; 8—electric heating coil; 9—second insulation layer; 10—second-stage HTL generation chamber; 11—residue scraping device; 12—catalyst grid; 13—second baffle cylinder; 14—first residue discharge port; 15—salt scraping device; 16—second residue discharge port; 17—mid-temperature hydrothermal transition product feed inlet; 18—mid-temperature hydrothermal transition product collection tank; 19—first-stage HTL generation chamber;

20—first-stage HTL reaction tube; 21—microwave controller; 22—hydrothermal product discharge port; 23—high-temperature and high-pressure needle valve; 24—microwave generator; 25—mid-temperature hydrothermal transition product discharge port; 26—mixing pipe; 27—receiving pipe; 28—nozzle; 29—second material feed port; 30—medium feed port; and 31—diffusion pipe.

DETAILED DESCRIPTION OF THE EMBODIMENTS

In order to enable those skilled in the art to better understand the solutions of the present disclosure, the technical solutions in the embodiments of the present disclosure will be clearly and completely described below in conjunction with the accompanying drawings in the embodiments of the present disclosure, and obviously, the described embodiments are only a part of the embodiments of the present disclosure, rather than all of the embodiments. Based on the embodiments in the present disclosure, all other embodiments obtained by those of ordinary skill in the art without making inventive steps should belong to the scope of protection of the present disclosure.

It should be noted that the terms "first", "second" and the like in the description and claims of the present disclosure and the drawing above are used for distinguishing similar objects and are not necessarily used for describing a specific order or sequence. It should be understood that data so used may be interchanged under appropriate circumstances such that the embodiments of the present disclosure described herein can be implemented in an order other than those illustrated or described herein. In addition, the terms "including" and "having" and any variations thereof are intended to cover a non-exclusive inclusion, e.g., a process, method, system, product, or device that includes a series of steps or units is not necessarily limited to those steps or units expressly listed but may include other steps or units not expressly listed or inherent to such process, method, product, or device.

The present disclosure is described in further detail below with reference to the accompanying drawings:

an object of the present disclosure is to provide a two-stage co-liquefaction mixing-reaction-filtration-heat recovery integrated apparatus to solve the technical problems that the mixing efficiency of a plurality of materials and mediums is low; and a material mixer, a reactor, a solid-phase product filter, and heat recovery for HTL are separated and complex, so two-stage HTL cannot be achieved and there is a risk of severe blockage of pipelines caused by deposition of salt in biomass due to high temperature in the prior art.

In particular, according to the FIGURE, the two-stage co-liquefaction mixing-reaction-filtration-heat recovery integrated apparatus includes a first-stage HTL generation chamber 19, a second-stage HTL generation chamber 10, and a mid-temperature hydrothermal transition product collection tank 18, wherein one side at the top of the first-stage HTL generation chamber 19 is provided with a plurality of material feed ports and medium feed ports 30, the other side at the top of the first-stage HTL generation chamber 19 is provided with a high-temperature hydrothermal product feed inlet 3, a hydrothermal product discharge port 22 is disposed at the bottom of the first-stage HTL generation chamber 19, a plurality of first-stage HTL reaction tubes 20 are obliquely disposed inside the first-stage HTL generation chamber 19, the plurality of the first-stage HTL reaction tubes 20 are connected in sequence, one end of each of the first-stage HTL reaction tubes 20 extends out through an inner wall of the first-stage HTL generating chamber 19 and is connected to an input end of the mid-temperature hydrothermal transition product collection tank 18, and one end of the first-stage HTL reaction tube 20 at a top is connected to the plurality of the material feed ports and the medium feed ports 30; a mid-temperature hydrothermal transition product feed inlet 17 is disposed on a side wall at the bottom of the second-stage HTL generation chamber 10, and an output end of the mid-temperature hydrothermal transition product collection tank 18 is connected to the mid-temperature hydrothermal transition product feed inlet 17; the second-stage HTL generation chamber 10 is coaxially provided with a second baffle cylinder 13 and a first baffle cylinder 7 along an inner wall to a central position, wherein a heating zone is formed between an outer wall of the second baffle cylinder 13 and the inner wall of the second-stage HTL generation chamber 10, a catalytic zone formed between the second baffle cylinder 13 and the first baffle cylinder 7 is provided with a plurality of catalyst grids 12, a heat preservation zone is formed in the first baffle cylinder 7, the top of the second-stage HTL generation chamber 10 corresponding to the heat preservation zone is provided with a high-temperature hydrothermal product discharge port 4, the high-temperature hydrothermal product discharge port 4 communicates with the high-temperature hydrothermal product feed inlet 3, the first baffle cylinder 7 is provided with a residue removal mechanism, the bottom of the second-stage HTL generation chamber 10 is provided with a second residue discharge port 16, and an outer side at the bottom of the second-stage HTL generation chamber 10 is further provided with a first residue discharge port 14.

In particular, a nozzle 28 is disposed between the plurality of the material feed ports and the medium feed ports 30 and one end of the first-stage HTL reaction tube 20 at the top, wherein one end of the nozzle 28 is provided with a plurality of pipes which are correspondingly connected to the plurality of the material feed ports and the medium feed ports 30 in sequence, and the other end of the nozzle 28 is a single pipe which is connected with one end of the first-stage HTL reaction tube 20.

Wherein a receiving pipe 27, a mixing pipe 26, and a diffusion pipe 31 are disposed in sequence between the nozzle and one end of the first-stage HTL reaction tube 20, wherein the receiving pipe 27, the mixing pipe 26, and the diffusion pipe 31 are in a reduced diameter structure.

Specifically, each first-stage HTL reaction tube 20 is provided with an inclination angle of 1-3°.

Specifically, high-temperature and high-pressure needle valves 23 are disposed at one end of each first-stage HTL reaction tube 20 near the mid-temperature hydrothermal transition product collection tank 18 and between the first-stage HTL reaction tubes 20.

In particular, an electric heating coil 8 is disposed between a second insulation layer 9 and an outer wall of the second-stage HTL generation chamber 10.

In particular, the top of the first baffle cylinder 7 is provided with a filter screen 6, and the residue removal mechanism extends into the first baffle cylinder 7 through the filter screen 6.

Wherein the residue removal mechanism includes a motor 5, a rotating shaft, a residue scraping device 11 and a salt scraping device 15, wherein one end of the rotating shaft is equipped with the motor 5, the other end of the rotating shaft extends into the first baffle cylinder 7 through the filter screen 6, and the residue scraping device 11 and the salt scraping device 15 are respectively mounted on the rotating shaft in the first baffle cylinder 7.

Specifically, the first-stage HTL generation chamber 19 is provided with a microwave controller 21, and the first-stage HTL generation chamber 19 and the second-stage HTL generation chamber 10 are both provided with a plurality of microwave generators 24.

EMBODIMENT

This embodiment provides a microwave-assisted integrated two-stage co-liquefaction mixing-reaction-filtration device capable of precisely controlling the reaction time, including:

a first-stage HTL generation chamber 19 and a second-stage HTL generation chamber 10, wherein an outer layer of the first-stage HTL generation chamber 19 is provided with a first insulation layer 2, first-stage HTL reaction tubes 20 are disposed inside the first-stage HTL generation chamber 19, a first material feed port 1, a second material feed port 29 and medium feed ports 30 are disposed at an upper left side of the first-stage HTL generation chamber 19, a high-temperature hydrothermal product feed inlet 3 is disposed at an upper right side of the first-stage HTL generation chamber 19, and a hydrothermal product discharge port 22 is disposed at a lower left side of the first-stage HTL generation chamber 19; and the second-stage HTL generation chamber 10 is sequentially provided with a second insulation layer 9 and an electric heating coil 8 from outside to inside, a first baffle plate/cylinder 7 and a second baffle plate/cylinder 13 coaxially disposed inside the second-stage HTL generation chamber 10 divide a reaction zone of the second-stage HTL generation chamber into a heating zone, a catalytic zone and a heat preservation zone, a filter screen 6 is disposed at an upper side inside the second-stage HTL generation chamber 10 to achieve separation of a solid-phase product from an HTL product, the top of the second-stage HTL generation chamber 10 is provided with a high-temperature hydrothermal product discharge port 4, and a second residue discharge port 16 is disposed in a middle at a bottom of the second-stage HTL generation chamber 10, and a first residue discharge port 14 is disposed at a right side at the bottom of the second-stage HTL generation chamber 10.

A reaction zone between an inner wall of the second-stage HTL generation chamber 10 and the second baffle cylinder 13 is the heating zone, the temperature is raised from 150-250° C. to 300-350° C., a reaction zone between the second baffle cylinder 13 and the first baffle cylinder 7 is the catalytic zone provided with catalyst grids 12 for storing a heterogeneous catalyst for HTL, and a reaction zone inside the first baffle plate/cylinder 7 is the heat preservation zone in which a material is subjected to an HTL reaction at a temperature maintained at 300-350° C.

A motor 5 is disposed on an outer side of the second-stage HTL generation chamber, and a rotating shaft drives a residue scraping device 11 and a salt scraping device 15 which are fixed on the shaft and arranged in the heat preservation zone to rotate, so as to scrape off filter residues and salts which are deposited on an inner wall of a reactor and on the filter screen.

The first-stage HTL reaction mainly involves the first-stage HTL generation chamber 19, the mid-temperature hydrothermal transition product collection tank 18, the high-temperature and high-pressure needle valves 23, and a mid-temperature hydrothermal transition product discharge port 25, the outflow of a first-stage HTL product is controlled by opening and closing of the high-temperature and high-pressure needle valves, and precise control of the first-stage HTL reaction time is achieved, and the effluent mid-temperature HTL product is collected into the mid-temperature hydrothermal transition product collection tank 18, and then enters the second-stage HTL generation chamber through a mid-temperature hydrothermal transition product feed inlet to be subjected to a more intense HTL reaction.

A nozzle 28, a receiving chamber 27, a mixing chamber 26, and a diffusion chamber 31 are disposed between the material feed ports and the medium feed port and the first-stage HTL reaction tubes 20 to achieve thorough mixing of a first material, a second material, and a medium. Each first-stage HTL reaction tube is provided with an inclination angle of 1-3°.

A microwave controller 21 and microwave generators 24 are disposed outside the reactor to assist the HTL reaction to improve the yield and quality of biocrude.

When the two-stage co-liquefaction mixing-reaction-filtration-heat recovery integrated apparatus according to the present disclosure is used:

during co-hydrothermal liquefaction of microalgae and sludge, the microalgae and the sludge respectively enter the first-stage HTL generation chamber 19 from the first material feed port 1 and the second material feed port 29, and a water medium enters the first-stage HTL generation chamber 19 from the medium feed port, so that the sludge, the microalgae and the water reach an appropriate ratio. A mixed reactant slurry descends along the first-stage HTL reaction tubes 20, and is heated by heat of a medium coming out from the second-stage HTL generation chamber 10 to 150-250° C. to be subjected to a mid-temperature HTL reaction. After 20 min, after the desired first-stage reaction time is reached, a mid-temperature hydrothermal transition product is discharged from the mid-temperature hydrothermal transition product discharge port 25 through the high-temperature and high-pressure needle valves 23, and flows into the second-stage HTL generation chamber 10 for a high-temperature HTL reaction.

Slurry entering the second-stage HTL generation chamber 10 through a mid-temperature hydrothermal transition product feed inlet 17 is first heated to 350° C. in a heating reaction zone by means of the electric heating coil 8, and subsequently baffled back into a catalytic reaction zone via the action of the baffle cylinders, and efficient conversion of organic compounds is achieved by the catalytic grids arranged in the catalytic reaction zone under the action of a heterogeneous catalyst. A slurry reaching the bottom is again baffled back under the action of the baffle cylinders, and after a solid phase in the product is filtered through the filter screen 6 at the top, the resulting material is discharged from the high-temperature hydrothermal product discharge port 4 at the upper left side, enters the first-stage HTL generation chamber 19 to heat an incoming slurry, and is finally discharged from the hydrothermal product discharge port 22 at the lower left side of the first-stage HTL generation chamber 19.

Throughout the process, the motor 5 above the second-stage HTL generation chamber 10 drives the residue scraping device 11 and the salt scraping device 15 in the second-stage HTL generation chamber 10 to rotate, and filter residues and a salt layer which are deposited on the inner wall of the reactor and the filter screen 6 are cleaned, and discharged from the residue discharge ports at the bottom after the reaction is finished.

In summary, the present disclosure provides the two-stage co-liquefaction mixing-reaction-filtration-heat recovery integrated apparatus, realizing the implementation of a two-stage HTL process; secondly, the nozzle, the receiving chamber, the mixing chamber and the diffusion chamber are disposed at different material feed ports and the medium feed ports, and high-speed fluids are fully collided and mixed in these structures; thirdly, heat of HTL in the first stage is from heat of an HTL product in the second stage, which simultaneously achieves the occurrence of an HTL reaction in the first stage and the recycling of the heat of the HTL product in the second stage, improving economic efficiency; fourthly, in a first-stage HTL process, through the setting of high-temperature and high-pressure needle valves, precise control of different reaction times is achieved, so that different first-stage HTL reaction times are selected for different material characteristics; and finally, each first-stage HTL reaction tube is provided with an inclination of 1-3°, and a second-stage HTL generation chamber is provided with a residue scraping device and a salt scraping device, and stable operation of the reactor is ensured. The apparatus is a highly integrated apparatus, which realizes the coupling of mixing, reaction, filtration, and heat recovery processes, greatly reducing the complexity and construction cost of the system. A new liquefaction process of co-hydrothermal liquefaction and two-stage HTL is used to obtain high yield and high-quality biocrude, improving the economic efficiency of the system, and promoting the industrial development of HTL technology.

Finally, it should be noted that the above embodiment is only used to illustrate, but not limit the technical solution of the present disclosure, although the present disclosure has been described in detail with reference to the above embodiment, it should be understood by those of ordinary skill in the art that modifications or equivalent substitutions may still be made to specific embodiments of the present disclosure, and that any modifications or equivalent substitutions without departing from the spirit and scope of the present disclosure should be covered within the scope of protection of the claims of the present disclosure.

What is claimed is:

1. A two-stage co-liquefaction mixing-reaction-filtration-heat recovery integrated apparatus, comprising a first-stage hydrothermal liquefaction (HTL) generation chamber (19), a second-stage HTL generation chamber (10) and a mid-temperature hydrothermal transition product collection tank (18), wherein one side at a top of the first-stage HTL generation chamber (19) is provided with a plurality of material feed ports and medium feed ports (30), the other side at the top of the first-stage HTL generation chamber (19) is provided with a high-temperature hydrothermal product feed inlet (3), a hydrothermal product discharge port (22) is disposed at the bottom of the first-stage HTL generation chamber (19), a plurality of first-stage HTL reaction tubes (20) are obliquely disposed inside the first-stage HTL generation chamber (19), the plurality of the first-stage HTL reaction tubes (20) are connected in sequence, one end of each of the first-stage HTL reaction tubes (20) extends out through an inner wall of the first-stage HTL generating chamber (19) and is connected to an input end of the mid-temperature hydrothermal transition product collection tank (18), and one end of the first-stage HTL reaction tube (20) at a top is connected to the plurality of the material feed ports and the medium feed port (30); a mid-temperature hydrothermal transition product feed inlet (17) is disposed on a side wall at the bottom of the second-stage HTL generation chamber (10), and an output end of the mid-temperature hydrothermal transition product collection tank (18) is connected to the mid-temperature hydrothermal transition product feed inlet (17); the second-stage HTL generation chamber (10) is coaxially provided with a second baffle cylinder (13) and a first baffle cylinder (7) along an inner wall to a central position, wherein a heating zone is formed between an outer wall of the second baffle cylinder (13) and the inner wall of the second-stage HTL generation chamber (10), a catalytic zone formed between the second baffle cylinder (13) and the first baffle cylinder (7) is provided with a plurality of catalyst grids (12), a heat preservation zone is formed in the first baffle cylinder (7), a top of the second-stage HTL generation chamber (10) corresponding to the heat preservation zone is provided with a high-temperature hydrothermal product discharge port (4), the high-temperature hydrothermal product discharge port (4) communicates with the high-temperature hydrothermal product feed inlet (3), the first baffle cylinder (7) is provided with a residue removal mechanism, the bottom of the second-stage HTL generation chamber (10) is provided with a second residue discharge port (16), and an outer side at the bottom of the second-stage HTL generation chamber (10) is further provided with a first residue discharge port (14).

2. The two-stage co-liquefaction mixing-reaction-filtration-heat recovery integrated apparatus according to claim 1, wherein a nozzle (28) is disposed between the plurality of the material feed ports and the medium feed ports (30) and one end of the first-stage HTL reaction tube (20) at the top, wherein one end of the nozzle (28) is provided with a plurality of pipes which are correspondingly connected to the plurality of the material feed ports and the medium feed port (30) in sequence, and the other end of the nozzle (28) is a single pipe which is connected with one end of the first-stage HTL reaction tube (20); and a receiving pipe (27), a mixing pipe (26), and a diffusion pipe (31) are disposed in sequence between the single pipe and one end of the first-stage HTL reaction tube (20), wherein the receiving pipe (27), the mixing pipe (26), and the diffusion pipe (31) are in a reduced diameter structure.

3. The two-stage co-liquefaction mixing-reaction-filtration-heat recovery integrated apparatus according to claim 1, wherein each first-stage HTL reaction tube (20) is provided with an inclination angle of 1-3°.

4. The two-stage co-liquefaction mixing-reaction-filtration-heat recovery integrated apparatus according to claim 1, wherein high-temperature and high-pressure needle valves (23) are disposed at one end of each first-stage HTL reaction tube (20) near the mid-temperature hydrothermal transition product collection tank (18) and between the first-stage HTL reaction tubes (20).

5. The two-stage co-liquefaction mixing-reaction-filtration-heat recovery integrated apparatus according to claim 1, wherein an electric heating coil (8) is disposed between a second insulation layer (9) and an outer wall of the second-stage HTL generation chamber (10).

6. The two-stage co-liquefaction mixing-reaction-filtration-heat recovery integrated apparatus according to claim 1, wherein the top of the first baffle cylinder (7) is provided with a filter screen (6), and the residue removal mechanism extends into the first baffle cylinder (7) through the filter screen (6).

7. The two-stage co-liquefaction mixing-reaction-filtration-heat recovery integrated apparatus according to claim 6, wherein the residue removal mechanism comprises a motor (5), a rotating shaft, a residue scraping device (11) and a salt scraping device (15), wherein one end of the rotating shaft is equipped with the motor (5), the other end of the rotating shaft extends into the first baffle cylinder (7) through the filter screen (6), and the residue scraping device (11) and the salt scraping device (15) are respectively mounted on the rotating shaft in the first baffle cylinder (7).

8. The two-stage co-liquefaction mixing-reaction-filtration-heat recovery integrated apparatus according to claim 1, wherein the first-stage HTL generation chamber (19) is provided with a microwave controller (21), and the first-stage HTL generation chamber (19) and the second-stage HTL generation chamber (10) are both provided with a plurality of microwave generators (24).

* * * * *